Patented July 20, 1948

2,445,737

UNITED STATES PATENT OFFICE 2,445,737

SYNTHETIC RUBBER COMPOSITION CONTAINING A REACTION PRODUCT OF SULFUR DICHLORIDE, AN ALDEHYDE AND AN ALKYL PHENOL

Harry E. Albert, Akron, Ohio, assignor to The Firestone Tire & Rubber Company, Akron, Ohio, a corporation of Ohio No Drawing. Application April 5, 1946, Serial No. 659,896

18 Claims. (Cl. 260—43)

This invention relates to improved synthetic rubber compositions and methods of using the same. More particularly, it relates to resins prepared from sulfur dichloride, a substituted phenol, and an aldehyde, and to the use of such resins to impart tack to uncured, rubber-like copolymers of a conjugated diene—for example, butadiene, isoprene, 2-cyanobutadiene, cyclopentadiene, methylpentadiene, piperylene, dimethylbutadiene, etc.—and a vinyl aromatic compound—for example, styrene, alpha-methylstyrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, etc. The tackifier may advantageously be employed with a rubber-like copolymer formed in the presence of rosin soap, or other tackifying material added in other ways. The invention will be described more particularly as it relates to the rubber-like copolymer of butadiene and styrene known as GR-S.

Difficulty has been experienced in the mechanical processing of GR-S because it does not naturally have the tack that natural rubber possesses. For example, when natural rubber is used in building a tire, the various plies of fabric treated with the uncured rubber readily adhere to one another when touched together or pressed together by hand. Furthermore, the tread stock which contains no fabric is sufficiently tacky so that it retains its place when merely pressed into position. The various parts of a tire prepared with uncured natural rubber, when assembled, adhere to one another so that the green tire produced by pressing together the uncured parts will withstand rather rough handling without damage.

The use of GR-S in tires has necessitated a change in the handling procedure because the rubber-like copolymers of butadiene and styrene (GR-S) are not tacky. Rough handling causes the plies to separate, and separations and failures in the cured tire may result from lack of tack in the GR-S stock used in building the tire.

According to the present invention, tack is imparted to rubber-like copolymers of butadiene and styrene, etc., by the incorporation therein of a resin from a hydrocarbon-substituted phenol, an aldehyde, and sulfur dichloride. Such tackifiers incorporated in the uncured stock give tack without adversely affecting the properties of the cured rubber obtained therefrom, and the degree of tack given the GR-S, etc., may approach that of natural rubber. The tackifier may be incorporated into GR-S stocks used for coating fabric, forming tire treads, etc., to impart sufficient tack to these tire component parts to permit them to be used in building tires in the same manner as was previously employed with natural rubber stocks.

Various experiments have been made with the use of this type of tackifier in uncured, rubber-like copolymers of a conjugated diene and a vinyl aromatic compound. In recording the results of the experiments in the following tables, the tack of copolymers which are completely lacking in tackiness is rated as 0, and the tackiness of milled, uncured natural rubber is rated as 10. Two sheets having such high tackiness of 10, when pressed together, have sufficient adherence that tears may occur when an effort is made to separate them. The closer the tack number approaches 10, the better the tack.

The tackifiers may be produced by first reacting the aldehyde and phenol and then treating the product with sulfur dichloride, or by first reacting the phenol with sulfur dichloride and then obtaining an aldehyde reaction product therefrom. The following examples are illustrative:

EXAMPLE 1

Seventy-five grams of para-tertiary-butyl-phenol were added to 37.5 grams of 40 per cent formalin (aqueous formaldehyde). Forty grams of a 10 per cent solution of sodium hydroxide were then added and the mixture stirred for 15 hours at 25° C. The mixture was neutralized with acetic acid and taken up in ethylene dichloride. The bulk of the water was removed by decantation, and the remainder was distilled off with some of the solvent until a clear distillate was observed. The dried product was diluted with ethylene dichloride until a solution was obtained that contained approximately 20 per cent of the phenol-formaldehyde reaction product. There was added to this solution at the reflux temperature of the solvent 28.4 grams of sulfur dichloride dissolved in an equal volume of ethylene dichloride. The addition of the sulfur dichloride was made over a one-half-hour period, and the refluxing was continued for one and one-half hours following this addition. The solvent was removed on a steam distillation bath under reduced pressure. The product is a dark brown resin with a softening point of 63–83° C. The yield was 86.9 grams.

EXAMPLE 2

Seventy-five grams of para-tertiary-butyl-phenol dissolved in 300 grams of ethylene dichloride were treated at the reflux temperature with 20.6 grams of sulfur dichloride dissolved in 20.6 grams of ethylene dichloride. The addition was made over a one-hour period, and the refluxing was continued for one-half hour thereafter. The solution was then cooled and washed with water until neutral to litmus. The ethylene dichloride solution of this phenol sulfide was returned to the reaction flask along with 42 grams of 40 per cent formaldehyde and 40 grams of 10 per cent sodium hydroxide solution. This mixture was stirred vigorously at 25° C. for one hour and then at 70° C. for three more hours. The mass was cooled and the water layer discarded. The solution was then heated under reduced pressure and the solvent removed up to a temperature of 100° C. The product, a hard, yellow resin which fused in the flask, was dug out. It has a softening and decomposition point of approximately 240–260° C. The yield was 81.5 grams.

EXAMPLE 3

Seventy-five grams of para-tertiary-butylphenol, 43 grams of 35 per cent formalin, and 40 grams of 20 per cent sodium hydroxide were heated under reflux with stirring at 85–95° C. for three and a half hours. The viscous syrup was poured into cracked ice in a mortar and pulverized. The mass was neutralized with 8 milliliters glacial acetic acid, washed several times with ice water, and filtered. Weight 140 grams.

The resin was placed in a flask and dissolved in 600 grams of ethylene dichloride by gently warming. Forty grams of water were removed by decantation, and a small amount of the solvent was distilled to remove the last traces of water.

The solvent was replaced, and to the stirred mixture at the reflux temperature was added a 50 per cent ethylene dichloride solution of sulfur dichloride containing 46.4 grams of the latter. The addition was made over a one-half-hour period. Refluxing was continued for one and a half hours. The solvent was removed on the steam bath under vacuum. The result was 110 grams of a clear brown resin which softened between 80–110° C.

EXAMPLE 4

One hundred grams of a para-tertiary-butylphenol-acetaldehyde resin (softening point 75–78° C.) were dissolved in 400 grams of ethylene dichloride, and to this refluxing solution there were added, over a 45-minute period, 6.0 grams of sulfur dichloride dissolved in an equal weight of ethylene dichloride. Refluxing was continued for one and one-half hours, and the solvent was removed on the steam bath under reduced pressure. The resin is amber to brown in color and has a softening range from 85–100° C.

EXAMPLE 5

Para-tertiary-decylphenol (46.8 grams), 15.0 grams of 40 per cent formaldehyde, and 20.0 grams of 10 per cent sodium hydroxide were stirred for 17 hours at 25° C. The reaction mixture was neutralized with acetic acid. The decylphenol-formaldehyde product was dissolved in 250 grams of ethylene dichloride and distilled until dry. The solvent was replaced, and 17.9 grams of sulfur dichloride dissolved in 20 grams of ethylene dichloride were added over a one-half-hour period at the reflux temperature of the mixture. Refluxing was continued for one hour, and the solvent was then removed on the steam bath under reduced pressure. The product is a dark brown, soft resin which softens between 60° and 80° C.

EXAMPLE 6

Eighty-two grams of ortho-tertiary-amylphenol were added to 37.5 grams of 40 per cent formalin. Forty grams of a 10 per cent aqueous solution of sodium hydroxide were then added, and the mixture was stirred at room temperature for 18 hours. The reaction mixture was neutralized with acetic acid. The product was taken up in ethylene dichloride and dried by decantation and the distillation of a small amount of the solvent.

A solution of such amylphenol-formaldehyde reaction product was adjusted to contain 53 grams of reaction product in 215 grams of ethylene dichloride. To this refluxing solution there was dropped, during the course of 30 minutes, a 50 per cent solution of 25.9 grams of sulfur dichloride in ethylene dichloride. The refluxing was continued for 2 hours to remove hydrogen chloride from the mixture, and then the solvent was distilled on a steam bath and under reduced pressure. The product is a soft, dark resin with a softening point of 60–80° C. The yield was quantitative.

EXAMPLE 7

Seventy-five grams of para-tertiary-butylphenol, 96 grams of glyoxal (ethandial), and 5 grams of concentrated sulfuric acid were stirred at 66° C. for one-half hour. Then the temperature was raised to 85–90° C., and stirring was continued for two more hours. The mass was neutralized with 50 milliliters of 10 per cent sodium hydroxide, extracted with 400 grams of ethylene dichloride and the water removed by decantation and distillation of a small portion of the solvent. The solvent was replaced, and 40 grams of sulfur dichloride dissolved in an equal weight of ethylene dichloride were added at the reflux temperature of the mixture. The addition of sulfur dichloride was made over a two-hour period with stirring, and the mixture was refluxed one hour following the addition. The solvent was removed on the steam bath under reduced pressure. The resin is brown in color, having a softening range from 65° to 85° C.

Other tackifiers may be similarly produced by treating other phenols substituted in the ortho or para position with a hydrocarbon radical containing about three to about ten carbon atoms. Other processes of forming the products may be utilized. The phenols which are preferred are those substituted in the para position with an alkyl radical containing four to seven carbon atoms, especially the secondary and tertiary para-butyl- and amylphenols. Other phenols which may be employed include, for example:

p-cyclohexylphenol
p-tertiary-butyl-m-cresol
p-hexylphenol
p-heptylphenol
p-n-amylphenol
p-secondary-butyl-m-cresol
p-n-butylphenol
p-neopentylphenol
p-phenylphenol
p-isoamylphenol
p-(1,1,3,3-tetramethylbutyl) phenol
p-isopropylphenol
o-amylphenol
o-butylphenol
o-(2-heptyl) phenol
o-cyclohexylphenol
o-phenylphenol The aldehydes which may be employed include formaldehyde, acetaldehyde, and glyoxal.

Experiments showed that improved tack was obtained when the uncured copolymer was compounded with a softener, such as a coal-tar oil, pine tar, dipentene, etc. The addition of a compound such as zinc resinate (or zinc rosinate) improved the tack. The tackifier may be added to the latex or may be compounded on a mill or in an internal mixer. It is necessary to obtain a certain amount of solution into the copolymer, but any means of accomplishing this—whether or not associated with other compounding ingredients and whether or not heat is applied—is satisfactory.

The first table gives the tack rating of a copolymer (GR-S) obtained from 75 parts of butadiene and 25 parts of styrene with 10 parts of each of the two resins prepared according to Examples 1 and 2 per 100 parts of GR-S:

TABLE I

| Tackifier: | Tack rating |
|---|---|
| None | 0 |
| p-Tertiary - butylphenol-formaldehyde-sulfur dichloride reaction product (Example 1) | 8–9 |
| p-Tertiary - butylphenol-sulfur dichloride-formaldehyde reaction product (Example 2) | 6 |

A copolymer of butadiene and styrene obtained in an emulsion containing rosin soap was compounded according to the following formula:

*Formula 1*

| | Parts |
|---|---|
| Copolymer | 50.00 |
| Tackifier | 2.50 |
| Pine tar | 1.25 |
| Dipentene | 1.50 |

The tackifiers of Examples 1 and 2 were compounded in this formula. The products were tested with the following results:

TABLE II

| Tackifier: | Tack rating |
|---|---|
| None (but containing pine tar and dipentene) | 2 |
| p-Tertiary - butylphenol-formaldehyde-sulfur dichloride reaction product (Example 1) | 7–8 |
| p-Tertiary - butylphenol-sulfur dichloride-formaldehyde reaction product (Example 2) | 6 |

Softeners improve the tack, particularly in the case of high-melting tackifiers, by aiding the solution of the tackifier in the copolymer.

The following table records the results obtained by adding to 100 parts of GR-S 10 parts of the tackifier of Example 4:

TABLE III

| Tackifier: | Tack rating |
|---|---|
| None | 0 |
| p-Tertiary-butylphenol - acetaldehyde-sulfur dichloride reaction product | 6–7 |

The tackifier of Example 3 was compounded according to different formulae and then tested for tack. The formula are given below:

*Formula 2*

| | Parts |
|---|---|
| GR-S | 50.0 |
| Tackifier | 2.5 |
| Dipentene | 2.5 |

*Formula 3*

| | Parts |
|---|---|
| GR-S | 50.0 |
| Tackifier | 2.5 |
| Dipentene | 2.5 |
| Easy-processing channel black | 15.0 |

It is recognized that channel black reduces tack, and the results of the experiment are recorded to show that even in the presence of this much black, the compound still had good tack. The results of the tests are recorded in the following table:

TABLE IV

| GR-S composition: | Tack rating |
|---|---|
| Formula 2 | 9 |
| Formula 2 control (no tackifier) | 1 |
| Formula 3 | 8 |
| Formula 3 control (no tackifier) | 0–1 |

The tackifiers of Examples 5, 6, and 7 were tested by mixing 10 parts with 100 parts of GR-S. The results are given in the following table:

TABLE V

| Tackifier: | Tack rating |
|---|---|
| None | 0 |
| p-Tertiary-decylphenol - formaldehyde-sulfur dichloride reaction product (Example 5) | 4 |
| o-Tertiary-amylphenol - formaldehyde-sulfur dichloride reaction product (Example 6) | 5 |
| p-Tertiary-butylphenol - glyoxal-sulfur dichloride reaction product (Example 7) | 8+ |

GR-S latex cements (aqueous dispersions) and ordinary solvent cements of GR-S type synthetic rubbers are notoriously poor in adhesive properties. However, when such cements contain a tackifier in accordance with the present invention, the cements exhibit substantially improved powers of adhesion, approaching conventional natural rubber cements in this respect.

The invention is not limited to the formulae disclosed or to other details of the disclosure. Modifications may be made without departing from the scope of the appended claims.

What I claim is:

1. Tacky, uncured, rubber-like composition composed of copolymer of a conjugated diene and a vinyl aromatic compound which includes as a tackifier a reaction product of (1) sulfur dichloride, (2) an aldehyde of the class consisting of formaldehyde, acetaldehyde, and glyoxal, and (3) a phenol of the class which consists of phenols substituted in the ortho position by a hydrocarbon radical containing three to ten carbon atoms and phenols substituted in the para position by a hydrocarbon radical containing three to ten carbon atoms, the aldehyde reaction being acid-catalyzed.

2. Tacky, uncured, rubber-like composition composed essentially of butadiene-styrene copolymer which includes as a tackifier a reaction product of (1) sulfur dichloride, (2) an aldehyde of the class consisting of formaldehyde, acetaldehyde, and glyoxal, and (3) a phenol of the class which consists of phenols substituted in the ortho position by a hydrocarbon radical containing three to ten carbon atoms and phenols substituted in the para position by a hydrocarbon radical containing three to ten carbon atoms, the aldehyde reaction being acid-catalyzed.

3. A tacky composition which contains rubber-like copolymer of butadiene and styrene and a tackifier which is the sulfur dichloride reaction product of a product obtained by the reaction of an aldehyde of the class consisting of formaldehyde, acetaldehyde, and glyoxal and an alkylphenol having para to the hydroxyl group an alkyl group containing four to seven carbon atoms, the aldehyde reaction being acid-catalyzed.

4. A tacky composition which contains uncured, rubber-like copolymer of butadiene and styrene and as a tackifier the product of the acid-catalyzed reaction of formaldehyde and the reaction product of sulfur dichloride and an alkylphenol which contains in the position para to the hydroxyl group an alkyl group containing four to seven carbon atoms.

5. A tacky composition which contains uncured, rubber-like copolymer of butadiene and styrene and as a tackifier the sulfur dichloride reaction product of the acid-catalyzed reaction product of formaldehyde and para-branched-chain-butylphenol.

6. A tacky composition which contains uncured, rubber-like copolymer of butadiene and styrene and the acid-catalyzed formaldehyde reaction product of the reaction product of sulfur dichloride and para-branched-chain-butylphenol.

7. A tacky composition which contains uncured, rubber-like copolymer of butadiene and styrene and the acid-catalyzed formaldehyde reaction product of the reaction product of sulfur dichloride and para-branched-chain-amylphenol.

8. A tacky composition which contains uncured, rubber-like copolymer of butadiene and styrene and as a tackifier the sulfur dichloride reaction product of the acid-catalyzed reaction product of an aldehyde of the class consisting of formaldehyde, acetaldehyde, and glyoxal and a phenol of the class consisting of ortho-alkylphenols and para-alkylphenols, the alkyl groups being branched chain and containing no more than ten carbon atoms.

9. A tacky composition which contains uncured, rubber-like copolymer of butadiene and styrene and acid-catalyzed the acetaldehyde reaction product of the reaction product of sulfur dichloride and para-branched-chain-amyl-phenol.

10. The process of imparting tack to a rubber-like copolymer of a conjugated diene and a vinyl aromatic compound which comprises incorporating in the copolymer the reaction product of (1) sulfur dichloride, (2) an aldehyde of the class consisting of formaldehyde, acetaldehyde, and glyoxal, and (3) a phenol of the class which consists of phenols substituted in the ortho position by a hydrocarbon radical containing three to ten carbon atoms and phenols substituted in the para position by a hydrocarbon radical containing three to ten carbon atoms, the aldehyde reaction being acid-catalyzed.

11. The process of imparting tack to parts formed of rubber-like butadiene-styrene copolymer and producing an article therefrom which comprises incorporating in the copolymer from which the parts are made sufficient tackifier to cause the parts to cohere when brought in contact, forming the green article from the parts, and then vulcanizing; the tackifier being the reaction product of an aldehyde of the class consisting of formaldehyde, acetaldehyde, and glyoxal, on the reaction product of sulfur dichloride and a phenol of the class which consists of phenols substituted in the ortho position by a hydrocarbon radical containing three to ten carbon atoms and phenols substituted in the para position by a hydrocarbon radical containing three to ten carbon atoms, the aldehyde reaction being acid-catalyzed.

12. The process of imparting tack to parts formed of rubber-like butadiene-styrene copolymer and producing an article therefrom which comprises incorporating in the copolymer from which the parts are made sufficient tackifier to cause the parts to cohere when brought in contact, forming the green article from the parts, and then vulcanizing; the tackifier being the sulfur-dichloride reaction product of the acid-catalyzed reaction product of an aldehyde of the class consisting of formaldehyde, acetaldehyde, and glyoxal and a phenol of the class which consists of phenols substituted in the ortho position by a hydrocarbon radical containing three to ten carbon atoms and phenols substituted in the para position by a hydrocarbon radical containing three to ten carbon atoms.

13. A tacky composition which contains rubbery copolymer of butadiene and styrene and a tackifier which is the sulfur dichloride reaction product of a product obtained by the reaction with acid catalyst of an alkylphenol having para to the hydroxyl group an alkyl group containing four to seven carbon atoms and an aldehyde of the group consisting of formaldehyde, acetaldehyde and glyoxal.

14. A tacky composition which contains rubbery copolymer of butadiene and styrene and a tackifier which is the sulfur dichloride reaction product of a product obtained by the reaction with acid catalyst of formaldehyde and an alkylphenol having para to the hydroxyl group an alkyl group containing four to seven carbon atoms.

15. A tacky composition which contains rubbery copolymer of butadiene and styrene and a tackifier which is the sulfur dichloride reaction product of a product obtained by the reaction with acid catalyst of acetaldehyde and an alkylphenol having para to the hydroxyl group an alkyl group containing four to seven carbon atoms.

16. A tacky composition which contains uncured rubbery copolymer of butadiene and styrene and as a tackifier the sulfur dichloride reaction product of the reaction product with acid catalyst of para-branched-chain-butyl phenol and an aldehyde of the class consisting of formaldehyde, acetaldehyde and glyoxal.

17. A tacky composition which contains uncured rubbery copolymer of butadiene and styrene and as a tackifier the sulfur dichloride reaction product of the reaction with acid catalyst of para-branched-chain-amyl phenol and an aldehyde of the class consisting of formaldehyde, acetaldehyde and glyoxal.

18. The process of imparting tack to parts formed of rubbery butadiene-styrene copolymer and producing an article therefrom which comprises incorporating in the copolymer from which the parts are made sufficient tackifier to cause the parts to cohere when brought into contact, forming the green article from the parts, and then vulcanizing; the tackifier being the sulfur dichloride reaction product of the reaction product with acid catalyst of an aldehyde of the class consisting of formaldehyde, acetaldehyde and glyoxal and a phenol of the class which consists of phenols having in the ortho position a hydrocarbon substituent containing three to ten carbon atoms and phenols having in the para position a hydrocarbon substituent containing three to ten carbon atoms.

HARRY E. ALBERT.

REFERENCES CITED

The following references are of record in the file of this patent:

UNITED STATES PATENTS

| Number | Name | Date |
|---|---|---|
| 1,704,629 | Samuel | Mar. 5, 1929 |
| 1,787,618 | Ellis | Jan. 6, 1931 |
| 2,139,321 | Mikeska | Dec. 6, 1938 |
| 2,246,321 | Rosen | June 17, 1941 |
| 2,270,959 | Murke | Jan. 27, 1942 |

FOREIGN PATENTS

| Number | Country | Date |
|---|---|---|
| 376,049 | Italy | Oct. 30, 1939 |
| 447,000 | Germany | July 14, 1939 |

---

Certificate of Correction

Patent No. 2,445,737.  July 20, 1948.

HARRY E. ALBERT

It is hereby certified that error appears in the printed specification of the above numbered patent requiring correction as follows:

Column 7, line 48, claim 9, for "acid-catalyzed the" read *the acid-catalyzed*;

and that the said Letters Patent should be read with this correction therein that the same may conform to the record of the case in the Patent Office.

Signed and sealed this 7th day of December, A. D. 1948.

[SEAL]

THOMAS F. MURPHY,
*Assistant Commissioner of Patents.* bon atoms and phenols having in the para position a hydrocarbon substituent containing three to ten carbon atoms.

HARRY E. ALBERT.

REFERENCES CITED

The following references are of record in the file of this patent:

UNITED STATES PATENTS

| Number | Name | Date |
|---|---|---|
| 1,704,629 | Samuel | Mar. 5, 1929 |
| 1,787,618 | Ellis | Jan. 6, 1931 |
| 2,139,321 | Mikeska | Dec. 6, 1938 |
| 2,246,321 | Rosen | June 17, 1941 |
| 2,270,959 | Murke | Jan. 27, 1942 |

FOREIGN PATENTS

| Number | Country | Date |
|---|---|---|
| 376,049 | Italy | Oct. 30, 1939 |
| 447,000 | Germany | July 14, 1939 |

---

Certificate of Correction

Patent No. 2,445,737.                                        July 20, 1948.

HARRY E. ALBERT

It is hereby certified that error appears in the printed specification of the above numbered patent requiring correction as follows:

Column 7, line 48, claim 9, for "acid-catalyzed the" read *the acid-catalyzed*;

and that the said Letters Patent should be read with this correction therein that the same may conform to the record of the case in the Patent Office.

Signed and sealed this 7th day of December, A. D. 1948.

[SEAL]

THOMAS F. MURPHY,
*Assistant Commissioner of Patents.*